(12) United States Patent
Kovalan et al.

(10) Patent No.: US 6,694,382 B1
(45) Date of Patent: Feb. 17, 2004

(54) FLEXIBLE I/O SUBSYSTEM ARCHITECTURE AND ASSOCIATED TEST CAPABILITY

(75) Inventors: Mark A. Kovalan, Cedar Rapids, IA (US); Bryon L. Wiscons, Marion, IA (US); Ronald W. Aull, Cedar Rapids, IA (US); John L. Persick, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 381 days.

(21) Appl. No.: 09/643,060

(22) Filed: Aug. 21, 2000

(51) Int. Cl.⁷ .......................... G06F 3/00; G06F 13/00; G06F 13/12
(52) U.S. Cl. .................. 710/5; 710/33; 710/65
(58) Field of Search .................. 710/29, 31, 32, 710/33, 5, 62, 65, 15, 19; 711/202, 221; 370/216, 389, 351, 392, 395.21, 395.31, 395.32, 355, 400, 431; 714/1, 8, 25, 31

(56) References Cited

U.S. PATENT DOCUMENTS

| 5,184,312 | A | * | 2/1993 | Ellis .......................... 714/31 |
| 5,280,469 | A | * | 1/1994 | Taniguchi et al. .......... 370/355 |
| 5,617,413 | A | * | 4/1997 | Monacos ..................... 370/400 |
| 6,041,038 | A | * | 3/2000 | Aimoto ................. 370/395.21 |
| 6,151,297 | A | * | 11/2000 | Congdon et al. ........... 370/216 |

\* cited by examiner

*Primary Examiner*—Jeffrey Gaffin
*Assistant Examiner*—Joshua D. Schneider
(74) *Attorney, Agent, or Firm*—Nathan O. Jenson; Kyle Eppele

(57) ABSTRACT

A data transfer mechanism for directing data signals from signal-producing elements to signal-receiving elements is disclosed. The data transfer mechanism includes a plurality of input ports, with each input port being connected to a signal-producing element, and a plurality of output ports, with each output port being connected to a signal-receiving element. Each data signal that enters the data transfer mechanism through one of the plurality of input ports has data identification information associated therewith. The, data transfer mechanism directs the data signal to at least one of the plurality of output ports according to the data identification information associated with the data signal.

9 Claims, 6 Drawing Sheets

FLEXIBLE I/O SUBSYSTEM ARCHITECTURE AND ASSOCIATED TEST CAPABILITY

FIELD OF THE INVENTION

The present invention relates to electronics, and more particularly, to input-output (I/O) devices.

BACKGROUND OF THE INVENTION

Input/output (I/O) devices are an essential component in computing structures. I/O devices provide a means for signals from sensors or other devices to be sent to a processor or memory within the computing structure. I/O devices also provide a way for a computing structure to communicate with other processors or to a human user.

In highly complex computing environments it may be necessary to process data from many sources. For instance, in an avionics environment data from dozens of sensors must be input to a processor. This sensor data may be analog or discrete in format and is required to be converted to digital format at different rates. In addition, changes to the number or type of sensor data may be required from time to time. Typically, I/O devices place data into only a single data location. I/O controllers have been constructed that allow data transfer to multiple locations, but they typically use more complex dedicated hardware or slower software implementations to do so. Some software implementations require thousands of lines of code, which takes up valuable memory space and is expensive to develop. Furthermore, transferring and routing of data has typically been performed by separate functions from those used for entry or exit of data from a user.

A flexible input/output (I/O) subsystem is therefore desired to accommodate growth potential in current product types, as well as to promote re-use of the I/O capabilities as part of a more re-usable architecture. Required capabilities include the need to make input data available to a local user (e.g., a processor), and also to autonomously forward such data to other users (e.g., redundant lanes or channels, or to other external users for which the I/O subsystem may be acting as a data concentrator). Other needed functions include output of locally-generated (e.g., computed) data, queuing of data for order-dependent temporary storage, and the capability of providing immediate activations or alerts (such as interrupts) for specific data parameters. Low latency time data transfers are required for very high rate closed-loop control systems.

The I/O subsystem must further be of a simple enough nature and implementation to allow it to be analyzed and certified for highly critical applications in a cost-effective manner. Such applications may include the most critical aspects of flight control, such as automatic landing in near-zero visibility and Fly-By-Wire. Certification requirements include not only the need to ensure that the design is correct (i.e., no "generic errors"), but also to perform failure detection as necessary to ensure that an accumulation of random failures cannot produce a hazard. Availability is also an important parameter for such systems, further suggesting the need for small, simple approaches to I/O. The desired flexibility and growth have typically been in conflict with the need for simple mechanisms that are appropriate for certification of highly critical systems.

Another related issue is testing of an I/O device to ensure that the device is accurately and consistently relaying data signals as intended. Testing of an I/O device should include the signal-producing elements and the signal-receiving elements, including the memories used for look-up and storage. Such testing should also include the Interconnection among these Items. Such testing can be complicated by the enormous number of possible operations and transfers that may be performed. Furthermore, testing must check not only intended transfers, but also must recognize any unintended transfers that may occur due to a failure.

It is therefore an object of the invention to provide an I/O mechanism that is simple in construction and can handle a large amount of transfers.

It is another object of the invention to provide an I/O mechanism that can be quickly tested with a high degree of confidence in the testing results.

It is still another object of the invention to provide an I/O device that may be used to prevent corrupted data from being transferred to other components in a data processing environment.

It is yet another object of the invention to provide an I/O device that may be used in a modular processing architecture.

It is still another object of the invention to provide an I/O device that may be used to prevent the transfer of corrupt data in a redundant computing system.

A feature of the invention is an input/output mechanism that receives a plurality of data signals and transfers the signals to one or more output devices according to directions contained in a look-up table.

An advantage of the invention is that an input/output device having a simple architecture may be configured to transfer a wide variety of inputs and outputs in any desired combination.

SUMMARY OF THE INVENTION

The invention provides a data transfer mechanism for directing data signals from signal-producing elements to signal-receiving elements. The data transfer mechanism includes a plurality of input ports, with each input port being connected to a signal-producing element, and a plurality of output ports, with each output port being connected to a signal-receiving element. Each data signal that enters the data transfer mechanism through one of the plurality of input ports has data identification information associated therewith. The data transfer mechanism directs the data signal to at least one of the plurality of output ports according to the data identification information associated with the data signal.

In another aspect of the invention, a method of selectively transferring data signals between signal-producing elements and signal-receiving elements is disclosed. According to the invention, a first data transfer mechanism is provided that has a plurality of input ports and a plurality of output ports. Each input port is connected to a signal-producing element and each output port is connected to a signal-receiving element. A data signal is accepted from a first signal-producing element. A look-up table, which is stored in a memory, is accessed to determine what should be done with the data signal. The data signal is directed to at least one of the signal-receiving elements through at least one of the output ports according to information contained in the look-up table.

In another aspect of the invention, a method of testing the accuracy of transfers performed by a data transfer mechanism is described. The data transfer mechanism has a plurality of input ports attached to signal-producing elements and a plurality of output ports attached to signal-receiving elements. According to the method, preselected instructions, stored in a memory, are provided that direct the flow of data signals from the input ports to predetermined output ports. A test signal is generated that is representative in format to each data signal that is received by each input device under normal conditions. The test signals are fed through the input ports that are normally connected to the input devices such that the test signals fed through each input port are representative in format to the data signals received by each input port under normal conditions. Each output port is checked to ensure that the test signals are routed according to the preselected instructions.

According to still another aspect of the invention, an apparatus for transferring data signals is disclosed. A first input/output (I/O) device has a first plurality of input ports attached to signal-producing elements and a first plurality of output ports attached to signal-receiving elements. The first I/O device is connected to a data bus that transfers data signals between all components connected thereto. The data bus is connected to a processor. Each data signal entering the first data transfer mechanism through the data bus and the first plurality of input ports has a data identification information associated therewith. A first memory is connected to the data bus. The first memory stores at least one transfer directive that corresponds to each data identification information. A second memory is connected to the data bus. The second memory stores data signals as instructed by the transfer directive. The first I/O device directs data signals from at least one of the first plurality of input ports and at least one of the components connected to the data bus, to at least one of the first plurality of output ports and at least one of the components connected to the data bus, according to the at least one transfer directive stored in the first memory.

DETAILED DESCRIPTION OF THE DRAWINGS

Figure 1:
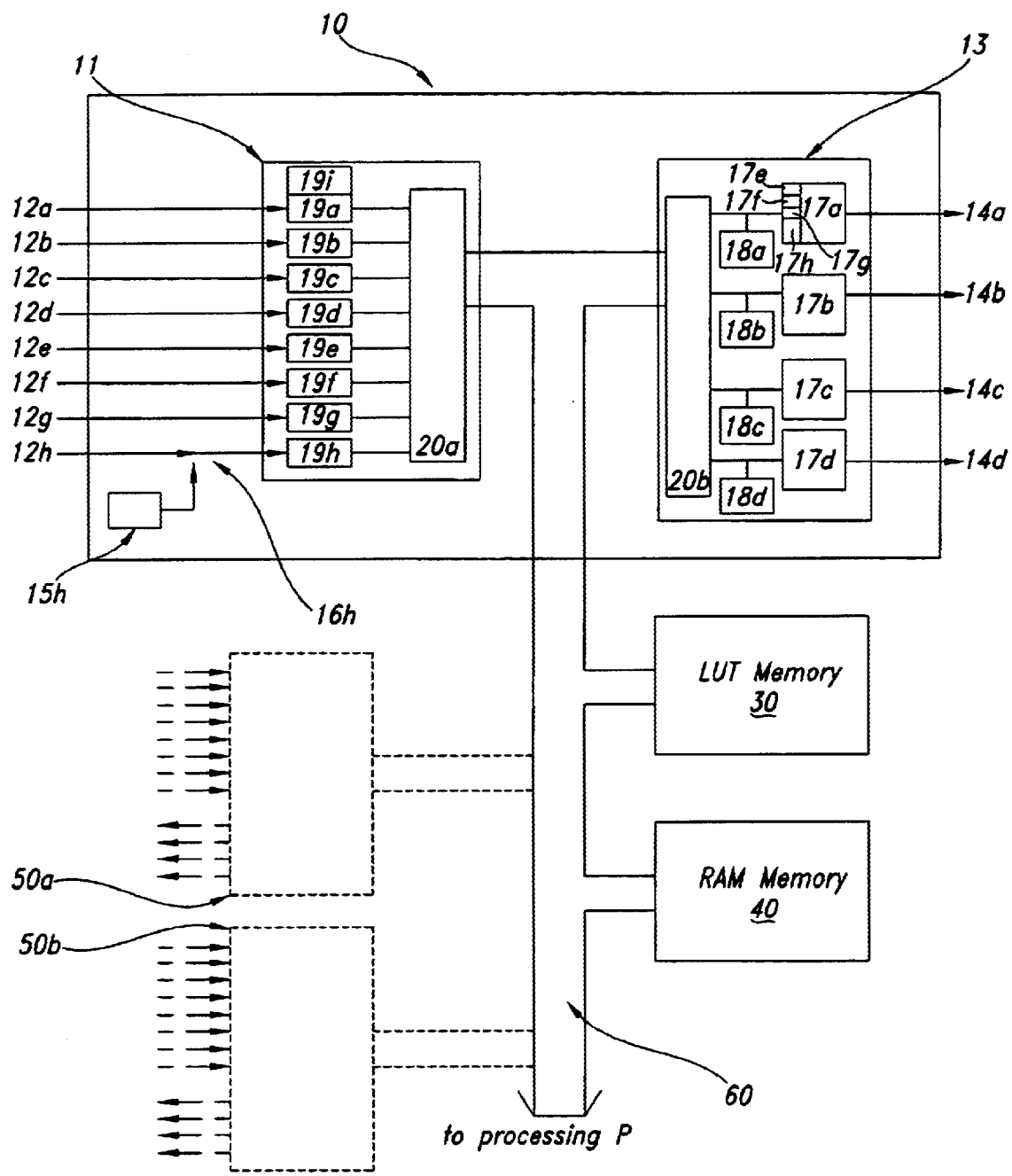
FIG. 1 is a schematic diagram of a data transfer mechanism according to the invention.

FIG. 1 shows a data transfer mechanism in the form of an I/O device 10 according to an embodiment of the invention. I/O device 10 includes a receiving section 11, which accepts data from a plurality of input ports 12a, 12b, 12c, 12d, 12e, 12f, 12g, 12h. Each input port carries a data signal into device 10 from at least one of a plurality of signal-producing elements (not shown), which may include sensors, processors, memory devices, input/output interfaces, data queues, and the like. Input ports 12a–h are connected to individual receiving devices 19a–h, respectively. Individual receiving device 19a is shown as having an input data queue 19i. Input data queue 19i accumulates or organizes incoming data prior to further processing. Although input data queue 19i is shown as being associated with individual receiving device 19a, it is preferable that all individual receiving devices 19a–h have input data queues associated therewith. Individual receiving devices 19a–h transmit data from input ports 12a–h into an interface 20a that is connected to a parallel bus 60. Interface 20a checks the data and directs the data to an intended destination, as will be explained further.

I/O device further includes a sending section 13. Sending section includes an interface 20b that is connected to parallel bus 60. Interface 20b directs data from parallel bus 60 to at least one individual sending device 17a, 17b, 17c, 17d. Each individual sending device 17a–d preferably includes a plurality of output data queues. For example, individual sending device 17a has four output data queues 17e, 17f, 17g, and 17h associated therewith. The output data queues may be prioritized so that data from a higher priority data queue will be transmitted from I/O device by individual sending device 17a before data from a lower priority data queue. Individual sending devices 17a–d send data through output ports 14a, 14b, 14c and 14d, respectively. Output ports 14a–d are connected to one or more of a plurality of signal-receiving elements (not shown), which may include processors, memory devices, logic ports, data queues, and the like.

Data received at each input port has labeling information associated therewith. The labeling information usually takes the form of a binary message accompanying the data that uniquely identifies the data. Data identification information includes the labeling information in conjunction with information identifying at which input port the data was received. Similar labeling information is thereby generally permitted to be used to signify different data items on different input ports, yet because of the additional information identifying the input port upon which the data was received, the data identification information remains unambiguous.

A directive locator is obtained from the data identification information. This may be accomplished through a number of means. Preferably the data identification information is transformed into a directive locator by concatenating a predetermined number of offset bits to the data identification information to form an address of a memory location. Specifically, the address is found in a look-up table (LUT) memory 30 that is connected to parallel bus 60 so that I/O device 10 can readily access the LUT memory. The directive locator points the I/O device to an address within LUT memory 30 where transfer directives uniquely associated with given data identification information are stored. The transfer directives will typically include one or more destinations where the data is to be sent. The destinations include the output ports 14a, 14b, 14c and 14d, as well as processor P, a RAM memory 40 connected to parallel bus 60, or to any other device connected to the parallel bus and configured to receive the data. The transfer directives may include reformatting information and/or substitute labeling information, as will be described more fully below.

Figure 2:
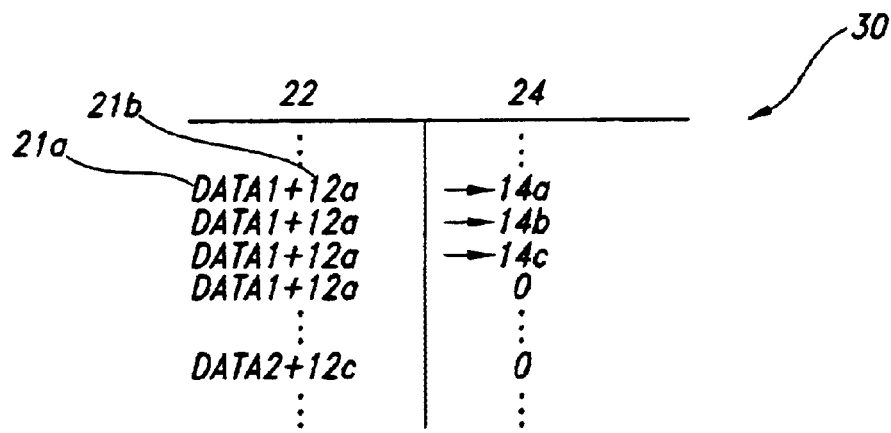
FIG. 2 is a schematic diagram of a look-up table that may be used with the data transfer mechanism of FIG. 1.

As an example, it may be desirable for a data signal received at input port 12a to be directed through output ports 14a, 14b, and 14c. As shown in FIG. 2, labeling information 21a transmitted with the data signal is combined with an input port identifier 21b to form data identification information 22 that is unique to that data signal. A directive locator is formed from the data identification information. The directive locator enables I/O device to locate an address within LUT memory 30 where transfer directives 24 unique to the data signal are stored. Transfer directives 24 direct the data from input port 12a to output ports 14a, 14b, and 14c. A subsequent entry includes a flag (in this embodiment, a "0") to indicate that the transfers relating to the data from port 12a are completed. In this manner, data from a plurality of signal-producing elements may be directed to any number of signal-receiving elements, including processor P, RAM memory 40, or to any other device connected to parallel bus 60. To this end, additional I/O devices 50a, 50b, which are similar in construction to I/O device 10, may be connected to parallel bus 60 to further increase the number of places from which data can be received and to which data can be sent.

It is also possible that data received by input ports 12a–h is not needed by any device connected to parallel bus 60 or to output ports 14a–d. In such a case the data is not transferred by I/O device. As shown in FIG. 2, for example, a data signal entering input port 12c may include labeling information of "DATA2". The transfer directive associated with that data's data identification information 22 comprises a flag "0", which indicates that no transfers of that data are to be accomplished. The data is then discarded and not used.

Although the embodiment is generally described as allowing transfer of data to specific places through output ports 14a, 14b, 14c, 14d or through parallel data bus 60, the embodiment may also transfer the knowledge that a data signal has arrived, where the specific data associated with the data signal may not be of concern. For example, an arriving data signal may be transferred via device 10 to an address on parallel bus 60 that directly activates a hardware-implemented function. As another example, the arriving data signal may be transferred to an address that activates an interrupt to a processor, which alerts the processor of the arrival of time-critical information. If the specific data associated with the data signal is needed by the processor, transfer directives within LUT memory 30 could be added to further direct the data to a memory location such as RAM memory 40, thus permitting the processor to access the data from there.

Figure 3:
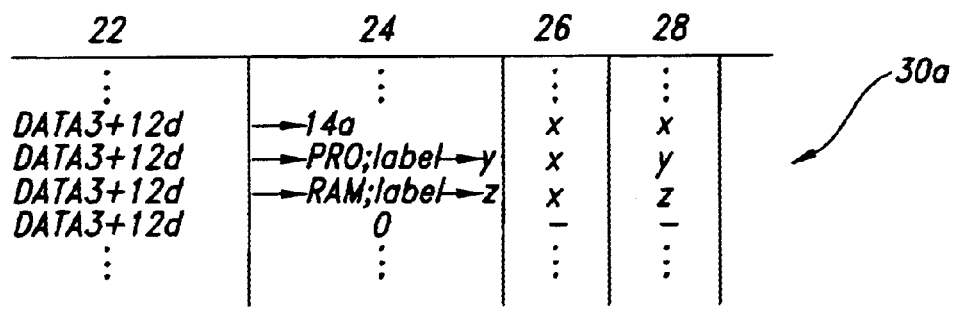
FIG. 3 is a schematic diagram of another look-up table that may be used with the data transfer mechanism of FIG. 1.

While the primary use of LUT memory 30 is to specify the place or places where data is to be transferred, additional information may also be included to specify one of a number of re-formatting operations that can be performed on a data signal as it is transferred by device 10. One type of re-formatting is to change labels or identifiers associated with the data signal. In some processing systems, labels or identifiers are used to aid in the processing or storage of data. Such a changing of labels is depicted in the LUT memory 30a shown in FIG. 3, where data entering I/O device 10 on input port 12d and having labeling information "DATA3" has an input label x, as shown in column 26. The data is routed to output port 14a, processor P and RAM 40, but the transfer directives 24 associated with the processor and RAM 40 indicate that changing the labels is necessary. Specifically, data going to the processor is given a label y, and the data going to RAM 40 is given a label z. Another type of re-formatting is to modify the data by shifting or otherwise altering the location of data bits of the data signal. This is done to allow convenient representation in particular data formats best suited to processing or monitoring. Such re-formatting may be accomplished using a multiplexor that allows each bit of a data signal to be selected from specified bits of the data signal or look-up table entries. Reformatting is triggered by including a command to reformat within a transfer directive associated with the data to be reformatted.

Figure 4:
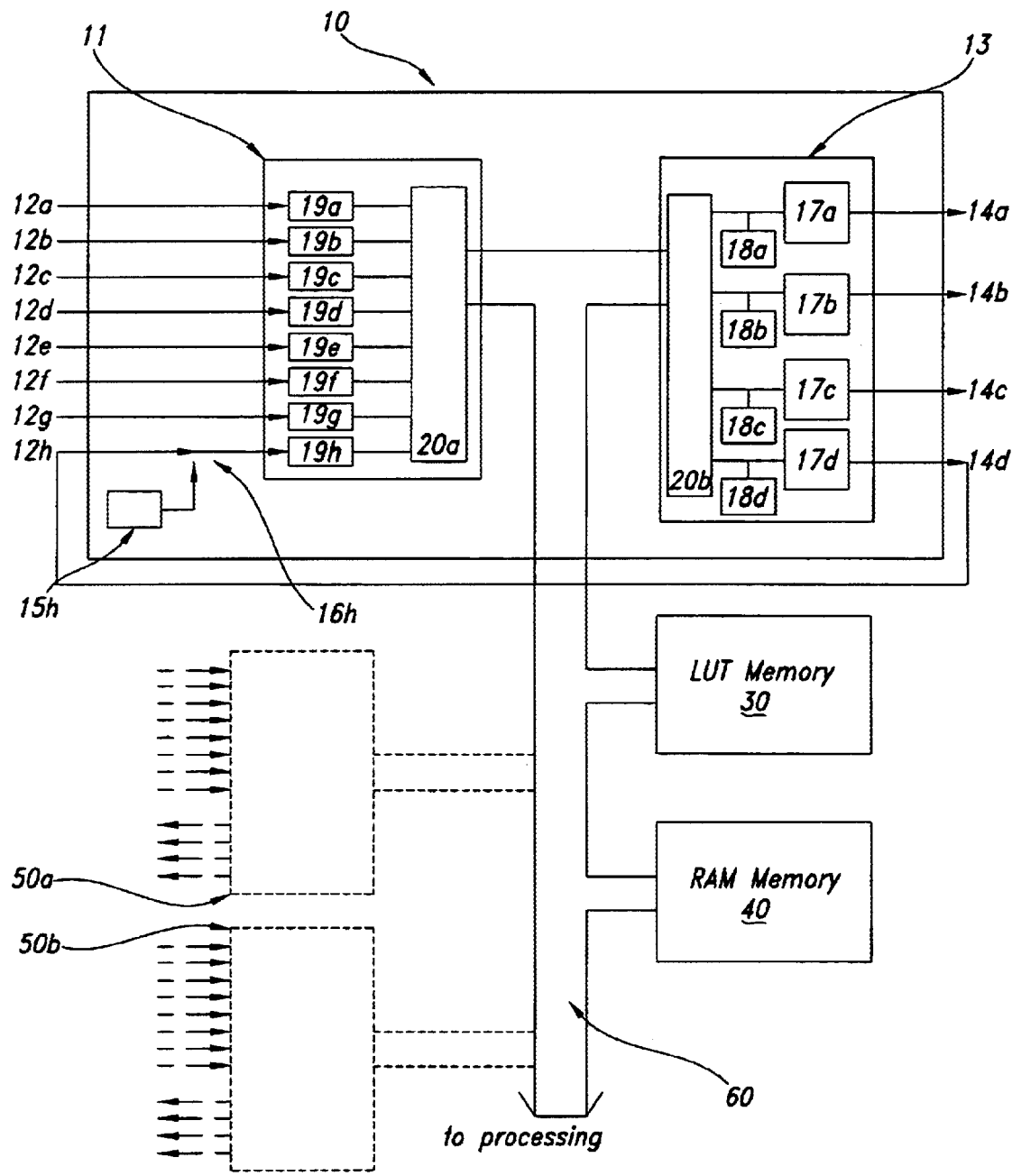
FIG. 4 is a schematic diagram of a data transfer mechanism according to another embodiment of the invention.

It is advantageous to designate a maximum number of places, termed a transfer limit "n", to which each data signal can be directly transferred. The reasons for this include optimizing the control sequencing logic as well as the size of the look-up table. Ideally, transfer limit n is selected to be small enough to realize these advantages while accommodating the maximum number of transfers ever required for a given input signal. For example, transfer limit n might equal four for I/O device 10. To accommodate a greater number of transfers, I/O device 10 may be modified to provide an iterative or regenerative data transfer capability. As shown in FIG. 4, output port 14d is connected to input port 12h. Transfer limit n is now selected so that most transfers can be accomplished through output ports 14a, 14b, and 14c. If the number of required transfers is five, which exceeds transfer limit n if n=4, I/O device 10 directs the signal through output ports 14a, 14b and 14c, as well as through output port 14d, which returns the signal to input port 12h in an iterative fashion. The I/O device then directs the data signal through two of output ports 14a, 14b or 14c as directed by the look-up table such that the total number of output transfers is five. In this fashion, the iterative output and input ports 14d, 12h permit the I/O device to direct data to any number of outputs.

I/O device 10 may be used to perform other desirable functions. For instance, it is often desirable to have data on an output bus that is a mix of autonomously transferred data and computed data from processor P. In this context autonomously transferred data is defined as data from an input port that is transferred by I/O device 10 to an output port without processor involvement. The I/O device may be instructed to so transfer a mixed signal of autonomous and processor data. However, there is a possibility that a failed processor will send corrupted data. It is also possible that a failed processor could send corrupted data with corrupted identifiers that would send the data to an incorrect output port. Since the processor is much more complex than the I/O device, there is a far greater likelihood that processor data will be corrupted rather than the autonomously transferred data. It would therefore be advantageous to take advantage of the low failure rate of the I/O device to reduce the risk of sending corrupted processor data. Past solutions to this problem have included filtering capability at each of the output ports that permits only certain data identifiers to be associated with processor data, thereby ensuring that the processor cannot send corrupted data with a data identifier corresponding to autonomous data. Such a solution requires additional hardware complexity since there must be a means to distinguish data on an identifier-by-identifier basis along with corresponding permittable output ports for the data.

Figure 5:
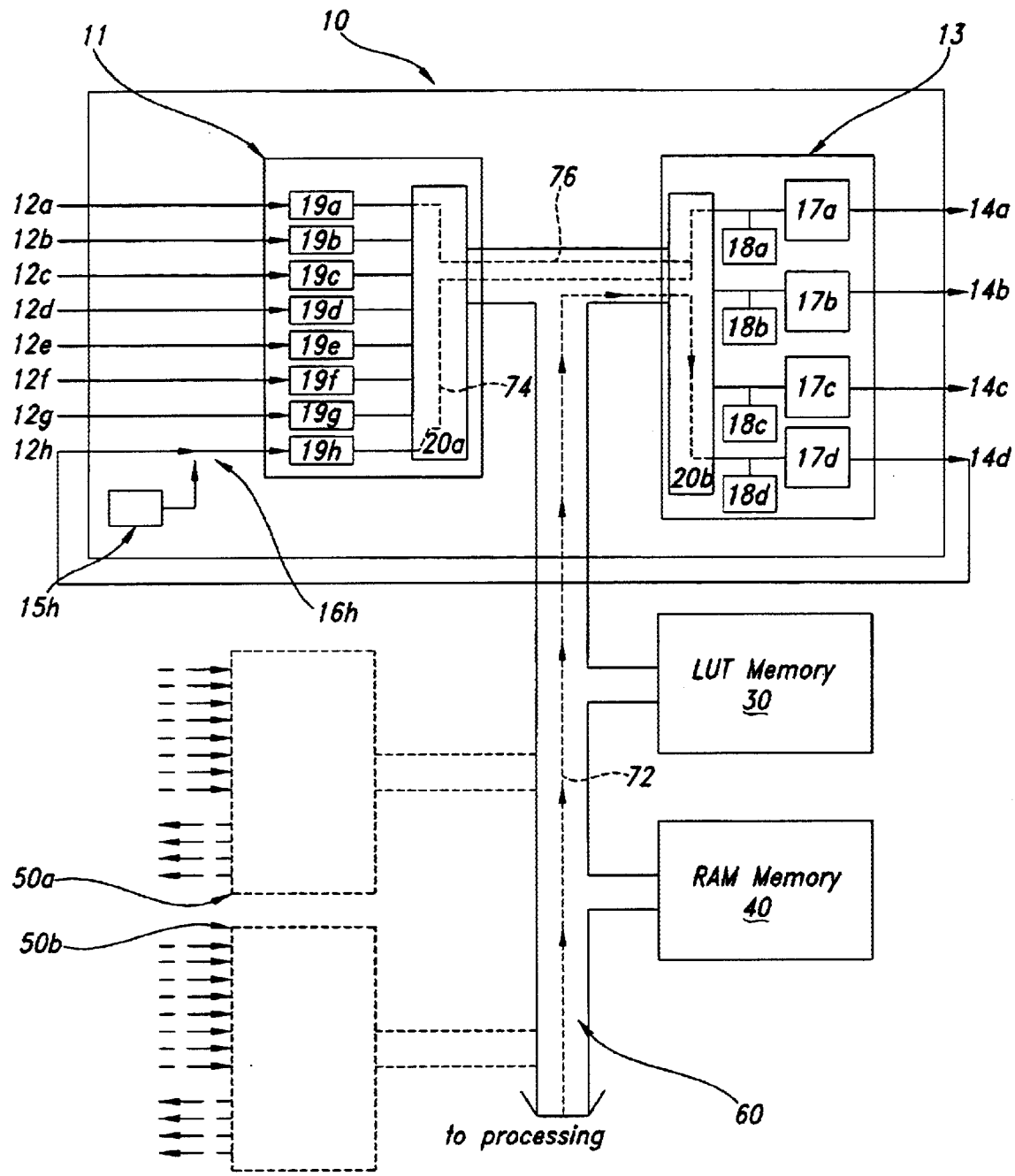
FIG. 5 is a schematic diagram of another embodiment of the invention.

The capabilities of I/O device 10 may be used to avoid the added complexity of filtering hardware. As shown in FIG. 5, sending section 13 permits processor data (shown at 72) to be only sent to output sending device 17d. Output sending device 17d directs data 72 through output port 14d, which is connected to input port 12h of the device. LUT memory 30 is then accessed, and the processor data is directed to one of the output ports 14a–d as shown by path 74. The processor data is therefore treated just like any other input data that has been received through the other input ports 12a–g. Transfer directives within LUT memory 30 may instruct the processor data to be mixed with autonomous data 76, as shown in FIG. 5. The transfer directives within LUT memory 30 ensure that data coming through input port 12h may only be written to specific output ports, such as port 14a in FIG. 5. LUT memory 30 will discard data from input port 12h that contains a corrupted or otherwise incorrect identifier. In the case of mixed data output port 14a, autonomous data 76 may still be sent even if the processor data is corrupted. Sending device 17a may be instructed to place the processor data in a queue having a lower-priority-than autonomous data 76 to ensure that the autonomous data is sent regardless of the status of the processor data. In this fashion, I/O device 10 prevents incorrect processor data from being sent to other devices. I/O device performs this task without additional filtering hardware.

Figure 6:
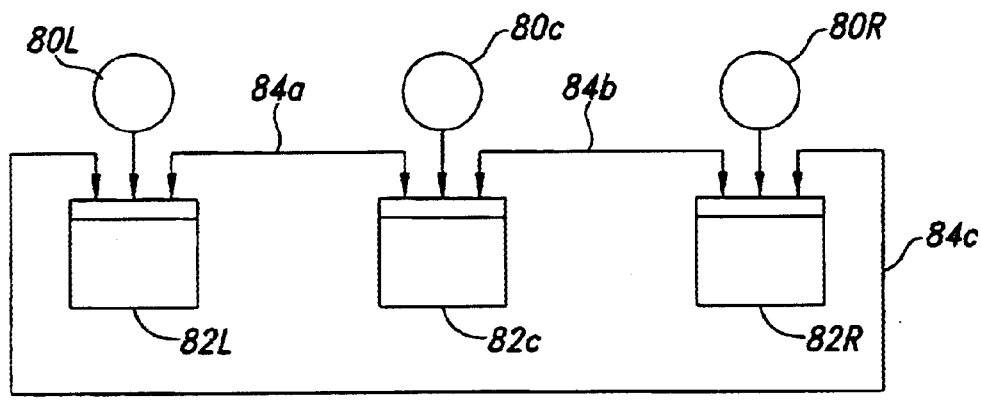
FIG. 6 is a schematic diagram of a redundant computing system.

Still another issue relating to avionics or other high-reliability systems is *the processing of redundant sensor data. Avionics systems typically use more than one instance of a function to ensure continued safe operation in the event of a failure. For example, an automatic landing system schematically shown in FIG. 6 may have three radio altimeters 80L, 80C, and 80R. Similarly, there may be three computers 82L, 82C and 82R that are performing an auto-land function, and each computer may vote on which of the altitude values provided by altimeters 80L, 80C and 80R to use in performing computations. Such voting is usually done by taking the middle value of the three altitude values that are obtained. This ensures continued operation in the event of a sensor failure, even when a sensor produces wildly incorrect information. A possible system topology is shown in FIG. 6 in which sensor 80L is connected to computer 82L, sensor 80C is connected to computer 82C, and sensor 80R is connected to computer 82R. To reduce aircraft wiring, the input portion of each computer is configured to re-transmit its directly received data to adjacent computers via cross-channel busses 84a, 84b and 84c, which can carry other sensor or computed values as well. Busses 84a–c are shown as single two-way connections between the computers, but the busses may also represent pairs of one-way connections between the computers. Using a cross-channel bus between adjacent computers reduces wiring in an aircraft when compared to the situation where each sensor is directly connected to each computer. The I/O device described in previous embodiments may be used to drive and receive the cross-channel busses because I/O device 10 can make data directly available in memory 40 for a local processor as well as sending the data through one of output ports 14a–d to other computers. Data from other computers can be received through other input ports 12a–h of the I/O device.

In highly safety-critical systems, a pitfall related to failure conditions exists for such topologies that mix redundant sensor data. Referring to FIG. 6, for example, computer 82C could potentially fail in a manner that causes it to replace signal data from sensor 80C with signal data from sensor 80R. Such a failure can remain latent for a long period of time. This may eventually cause a problem when voting to determine which of sensors 80L, 80C, 80R to use: if 80C transmits the sensor data from sensor 80R, then sensor 80R will get two "votes" and will most likely be used. This may be catastrophic if sensor 80R were then to fail to a value that would cause a hazard, in which case sensor 80R would be selected instead of being voted out. The latent failure of replacement of the data of sensor 80C is difficult to detect since multiple high-quality sensors measuring the same parameter will return very similar values.

Figure 7:
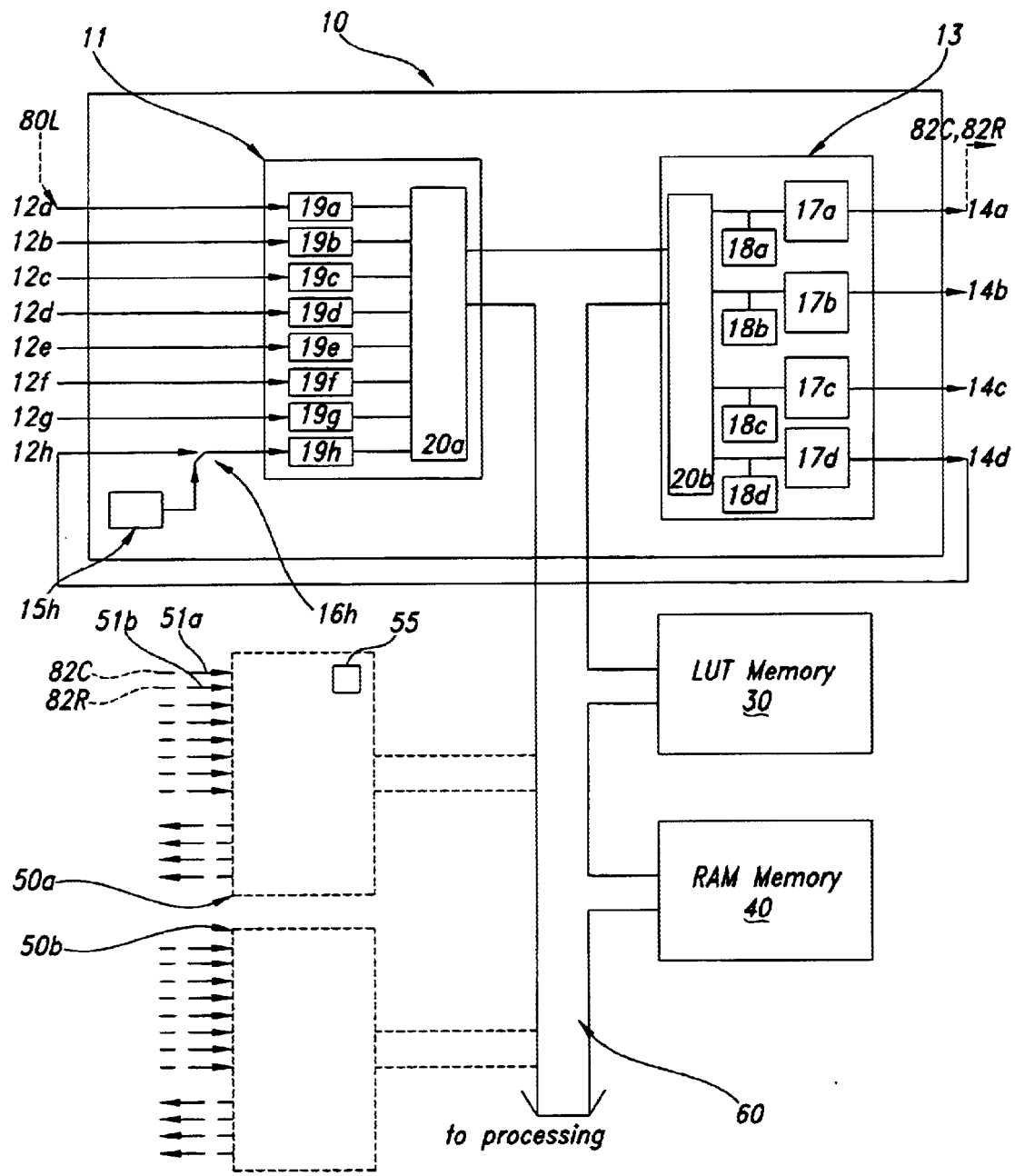
FIG. 7 is a schematic diagram of yet another embodiment of the invention.

Such errors in redundant systems may be prevented using I/O device 10 in connection with an additional I/O device 50a that is connected to parallel bus 60, as shown in FIG. 7. I/O device 10 receives an input from sensor 80L through input port 12a and transmits a signal to computers 82C and 82R through output port 14a. Additional I/O device 50a receives inputs from computers 82C and 82R through input ports 51a and 51b, respectively. Transfer directives, stored in LUT memory 30, that are associated with inputs 51a and 51b, do not include instructions to send data to output 14a. Alternately, the transfer directives could be programmed so that data from inputs 51a and 51b are not written to any output port on I/O device 10. Therefore, data coming from computers 82C and 82R via additional I/O device 50a can never be sent to computers 82C and 82R. Further confidence can be gained through a transfer inhibiting mechanism 55, preferably integral with additional I/O device 50a, which may be programmed to physically inhibit any transfers of data from the additional I/O device to I/O device 10. In this manner, faulty sensors or computers can be quickly ascertained, and redundant avionics system may be used with a high degree of confidence.

Another function that may be performed by I/O device 10 is the conversion of analog and discrete input signals to digital form. An avionics computer typically uses a number of analog inputs and discrete inputs in addition to-data bus inputs. These inputs must be converted to digital form for use in computations. Some inputs are required more frequently than other inputs, and analog/discrete inputs therefore are converted at differing frequencies or rates. For example, during an aircraft landing operation an altitude measurement is required much more often than an ambient temperature measurement, and a signal from an analog altitude sensor must be converted into digital form more often than a signal from an analog thermometer. The converted data may be used by the processing function of an avionics computer, and also transferred via a data bus to other computers, and different conversion rates may be desired for the different uses. For maximum flexibility, it is desired to make the conversion rates programmable so that the conversion rates may be adjusted as necessary. As a practical matter, the circuit card upon which analog and discrete input function conversions are performed is separate from the card or board upon which the processing functions are performed, and a data bus provides data transfers between the two cards. This is done because of card area and card connector pinout issues.

Figure 8:
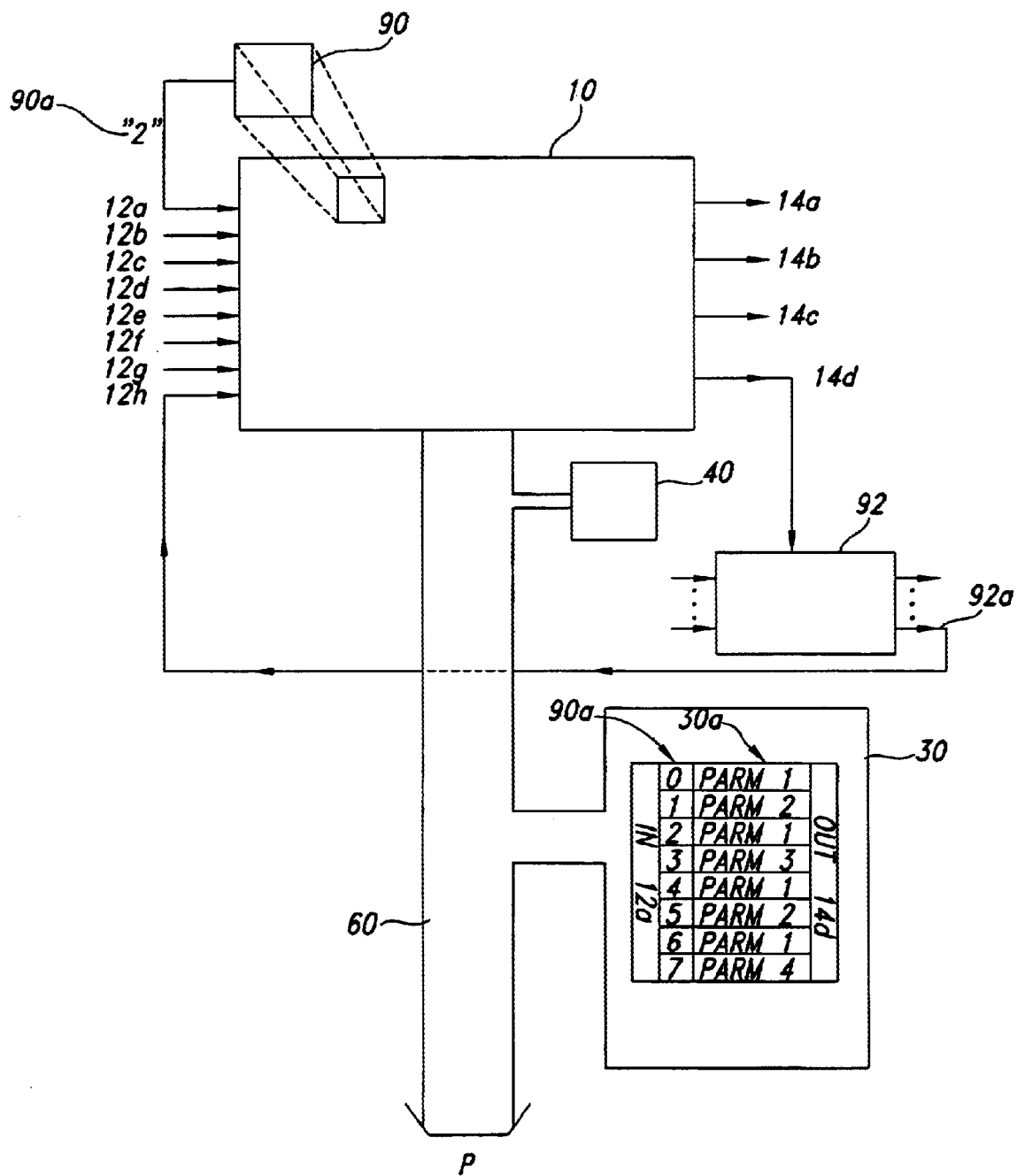
FIG. 8 is a schematic diagram of still another embodiment of the invention.

FIG. 8 depicts I/O device 10 configured to aid in the proper timing of analog or discrete signals to digital form. A data generator 90 is connected to input port 12a and is preferably integral with I/O device 10. Data generator 90 generates data signals that include sequential identifiers 90a. The sequential identifiers are produced by the data generator at a given rate and repeat after a predetermined time. As a simple example, sequential identifiers 90a are generated at a rate of 8 per second and repeated every second. An output port 14d of the I/O device is connected to a conversion device 92. Conversion device 92 receives input parameters or signals from a plurality of analog or discrete sources (not shown) and converts these signals into digital signals. An output 92a of conversion device is connected to input port 12h of I/O device 10.

In operation, when the data signal including sequential identifier 90a enters I/O device 10, LUT memory 30 is accessed. Appropriate transfer directives within LUT memory 30 instruct I/O device to send through output port 14d a conversion command 30a that corresponds to the sequential identifier that is received. Each conversion command 30a is an instruction to conversion device 92 to convert the signal from a specific analog or discrete data source into a digital signal. A representative table of corresponding sequential identifiers 90a and conversion commands 30a is shown in FIG. 8. For example, if sequential identifier 90a has a value of "2", LUT memory 30 returns a conversion command of "PARM 1", which when sent through output port 14d, instructs conversion device 92 to convert the signal or parameter from a first device into digital form. If sequential identifier 90a has a value of "5", LUT memory 30 returns a conversion command of "PARM 2", which instructs conversion device 92 to convert the signal or parameter from a second device into digital form. Conversion device 92 sends the converted, digital form of the signal through output port 92a to input port 12h of I/O device 10. The converted signal is treated as any other digital input signal and may be routed to one of outputs 14a, 14b, 14c and/or any other device connected to parallel bus 60 according to the transfer directives contained in LUT memory 30 as described in previous embodiments.

It can be seen that for a given set of sequential identifiers, conversion commands may be given for multiple parameters. In addition, in a given sequence of sequential identifiers 90a, conversion device 92 may receive commands to convert a parameter more than once. The example shown in FIG. 8 shows that for a sequence of eight sequential identifiers numbered 0 through 7, the conversion command of "PARM 1" is sent four times, the command of "PARM 2" is sent twice, and the commands of "PARM 3" and "PARM 4" are each sent once. Thus, LUT memory 30 permits the analog/discrete signals or parameters to be converted at different rates. As LUT memory 30 is easily programmable, the conversion rates of the analog/discrete signals may be varied and adjusted as desired. This feature is especially advantageous when a large number of analog/discrete signals must be converted at different rates.

Another method of the present invention could include a method of selectively transferring data signals between signal-reducing elements and signal-receiving elements, comprising: providing a first data transfer mechanism that has a plurality of input ports and a plurality of output ports, each input port being connected to one of the signal-producing elements and each output port being connected to one of the signal-receiving elements; accepting a data signal from a first signal-producing element; accessing a look-up table, which is stored in a memory, to determine what should be done with the data signal; and directing the data signal to at least one of the signal-receiving elements through at least one of the output ports according to information contained in the look-up table; wherein the first data transfer mechanism and the look-up table are connected to a data bus, the data bus being connected to a first processor, the method further including: providing a second data transfer mechanism that is connected to the parallel data bus, the second data transfer mechanism having a plurality of input ports and output ports connected to signal-producing elements and signal-receiving elements, respectively; receiving a first data signal through an input port of the first data transfer mechanism; sending a second data signal, corresponding to the first data signal, through an output of the first data transfer mechanism to a second processor; and receiving a third data signal through an input of the second data transfer mechanism, the second data signal being redundant to the first data signal; wherein information contained in the look-up table prevents data from the second data transfer mechanism from being sent to an output port of the first data transfer mechanism.

Having described several ways in which I/O device 10 may be used, the testing of I/O device will now be described. The testing approach developed for I/O device 10 performs a full test of data transfers for the specific configuration specified in LUT memory 30. This reduces the number of possible test operations to a number that can be practically managed, while providing assurance that I/O device 10 can perform any operations required of it in the configuration in which it is being used. Full testing of the interconnections of device 10 with the look-up table and other memory is therefore assured. Of course, a new test should be performed after any alteration of the LUT memory using an updated set of expected results. Further periodic testing may also be desirable. For instance, such testing may be run at each power-up of I/O device 10.

Testing includes the use of test case generators, where each input into the I/O device can select a test case generator associated with that input in place of the normal data input. A representative test case generator, shown schematically in FIGS. 1, 4–5 and 7 at 15h, is connected to input port 12h, it being understood that other test case generators may be connected to the other input ports 12a–g. Data from test case generator 15h is switched at 16h to be connected to receiving device 19h (FIG. 7). Each test case generator sequentially produces all data identifiers or labels, with unique data that is a function of the identification and input port. For convenience, the data may be merely sufficiently unique to be identified in result checking, which is explained below. All such test case generators may run simultaneously, provided that their rate of generating data is consistent with the overall bandwidth capability of the I/O device. In this manner, stress testing of the bandwidth capability may therefore be accomplished. In addition to the data from test case generators, a local processor may also contribute data words to the test data to aid in the testing of the I/O device.

Because data may be transferred to more than one signal-receiving element, a number of ways are used to observe and check the test results. Data transfers to memory such as RAM memory 40 may be checked by observing RAM memory 40 directly (using a local processor, for example), or by performing a consolidation operation to obtain a consolidation value (such as a checksum or a cyclic redundancy check (CRC)) and comparing the consolidation value to an expected result. Transfers to signal-receiving elements may be conveniently checked by attaching a data consolidator 18a, 18b, 18c, and 18d to each individual sending device 17a, 17b, 17c, and 17d, respectively, thereby obtaining a consolidation value representing all data transferred to that sending device. Similar consolidators may be used to check general queues and processor interrupt signals. Consolidation values generated by the consolidation operations may be read and checked by a local processor at the completion of the test, or at the completion of each part of a multi-part test. During testing of the I/O device it may be desirable to prevent output signals from actually being made available to signal-receiving elements. This may be done by disabling transmitters or output drivers while a data consolidation function removes data from output data queues 17e–g as if output were occurring. If an order-dependent (i.e., deterministic) consolidation function is to be used to check the data signals, then to ensure consistent results the processing or routing of the data signals must be programmed so that they are also order-dependent. An example of a deterministic consolidation process is a CRC-type consolidation, where the consolidation value so obtained reflects the order-dependence of the signals. For example, if a local processor contributes data to the test results in a queue, that data must be synchronized with the test data generators to ensure proper order.

Although additional and unintended transfers of output signals may be readily detected by checking consolidation values, unintended writes into volatile memory such as RAM may not be detected if a subsequent test case overwrites the same memory location with desired data before checking occurs. To detect additional and unintended transfers, a counter may be employed that counts the number of transfers that occur in a test. This counter may then be checked in the same manner as the consolidation values. By checking for all intended transfers (by comparing consolidation values to expected values) and checking that the correct number of transfers have occurred (using a transfer counter), it can be determined if I/O device 10 is operating correctly.

If LUT memory 30 directs I/O device 10 to transfer multiple input signals to the same memory location, one test result may be over-written by another test result during testing. Such a series of transfers may be successfully checked during a testing operation by directing the test case generators to pause after each phase of the test that could have data words over-written, so that the test signals may be checked as described above. The test case generators resume transmitting test signals after the test signals have been checked.

The invention may be modified in many ways consistent with the scope of the invention. For instance, the number of input and output ports may be more or less than eight and four, respectively, as described in the embodiments. The number of I/O devices included in a system may also be varied. It is also possible for data received through an input port to be sent to a given output port more than once. For example, different format conversions (with corresponding output identifiers) may be used for the receiving system. Also, the directive locators may be created or derived from the data identification information using hashing functions or by accessing content-addressable memory. With respect to the embodiment shown in FIG. 8, many non-digital signals may be converted thereby, and the conversion rates may be as high as is possible given known technology. Also, the data generator may generate any desired number of sequential identifiers at any acceptable rate. Other devices or components may be connected to parallel data bus 60, such as other processors, I/O devices, memory devices, interrupt devices, and the like. I/O device may be configured, through LUT memory 30, to write to any device connected to the parallel bus.

The invention has herein been described as a way to direct data inputs so that all data words entering the inputs are transferred to their destinations through sequential use of a single unified transfer means, where the means includes writes to bus addresses. The specific writes are referenced in a look-up table and may correspond to local RAM accessible by a processor, output devices, hardware activation decoders, general purpose queue inputs, etc. Locally-generated data (i.e., from processor P) also use such writes to output computed data. Prior I/O controllers have allowed transfer only to a single place, or have used dedicated hardware (or in some cases, complex software) to perform transfers to multiple places.

Another feature of the invention is that use of the unified transfer means allows a number I/O devices 10, 50a, 50b, each with some number of inputs and outputs, to be connected together via parallel bus 60 to obtain larger numbers of inputs and outputs for the entire system. Assuming that appropriate look-up table information is provided, it is of no consequence to a device whether it is transferring data to RAM memory 40, to one of its own outputs, or to an output of another I/O device. This modular nature of the invention provides a degree of flexibility and scalability not seen in previous I/O devices.

Further flexibility is obtained by allowing LUT memory 30 to be readily modified. This may be accomplished by permitting the LUT memory to be updated as part of an on-board software load. If desired, however, modification of LUT memory 30 may be inhibited (by disabling its write line, for example) for limited failure propagation during critical operating times.

The simplicity of I/O device 10 is well suited to critical systems in avionics and in other fields. For example, the I/O device and its associated look-up table may be easily designed and tested with the required level of assurance. Re-use of functional elements such as queues in various ways allows design verification of an element to be spread over a number of uses. Furthermore, iterative use of the transfer mechanism to perform data inputs, autonomous data output re-transmission, queuing, and alerting functions avoids the need for specific hardware designs of functional elements to perform each function. Although the iterative, sequential approach of the invention may in some instances trade bandwidth for simplicity, logic and memory speeds are typically much faster than I/O bus speeds, and transfer on a parallel bus magnifies this speed advantage when compared with serial buses. Acceptable bandwidth may therefore be achieved.

An advantage of the invention is that data can be easily routed as desired. For a given piece of input data, the look-up table can specify multiple places that the data can be transferred to, with the same straightforward mechanism used for each desired transfer.

Another advantage of the invention is that the device may be quickly and efficiently tested, and may therefore be used in any number of data processing environments.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of selectively transferring data signals between signal-producing elements and signal-receiving elements, comprising:

providing a first data transfer mechanism that has a plurality of input ports and a plurality of output ports, each input port being connected to one of the signal-producing elements and each output port being connected to one of the signal-receiving elements;

accepting a data signal from a first signal-producing element;

accessing a look-up table, which is stored in a memory, to determine what should be done with the data signal;

directing the data signal to at least one of the signal-receiving elements through at least one of the output ports according to information contained in the look-up table; and wherein the first signal-producing element is a data generator that cyclically generates sequential identifiers, the method further including:

connecting one of the output ports to a conversion device that converts non-digital signals into digital signals;

connecting an output of the conversion device to another of the input ports;

accepting one of the sequential identifiers from the data generator;

accessing the look-up table to determine which non-digital signal corresponds to the one of the sequential identifiers;

instructing the conversion device, through the one of the output ports to convert to a digital signal the non-digital signal that corresponds to the one of the sequential identifiers; and routing the digital signal into the other of the input ports;

wherein the digital signal is transferred to at least one of the output ports according to information contained in the look-up table.

2. The method of claim 1, wherein the data signal has a predetermined format as it is received into the first data transfer mechanism, and further including changing the format of the data signal prior to directing the data signal to at least one of the plurality of output ports.

3. The method of claim 1, wherein the first signal-producing element is a test case generator that is connected to one of the input ports, the method further including:

generating test data using the test case generator, the test data being representative of data signals received by the first data transfer mechanism during normal operation of the first data transfer mechanism; and checking the muting of the test data by the first data transfer mechanism and the look-up table to ensure proper transfer of data.

4. The method of claim 1, wherein the first data transfer mechanism and the look-up table are connected to a data bus, the data bus being connected to a first processor, the method further including:

providing a second data transfer mechanism that is connected to the parallel data bus, the second data transfer mechanism having a plurality of input ports and output ports connected to signal-producing elements and signal-receiving elements, respectively, receiving a first data signal through an input port of the first data transfer mechanism;

sending a second data signal, corresponding to the first data signal, through an output of the first data transfer mechanism to a second processor; and receiving a third data signal through an input of the second data transfer mechanism, the second data signal being redundant to the first data signal;

wherein information contained in the look-up table prevents data from the second data transfer mechanism from being sent to an output port of the first data transfer mechanism.

5. The method of claim 1, wherein the first data transfer mechanism and the look-up table are connected to a data bus, the data bus being connected to a processor, the method further including sending data signals from the processor to an output port according to instructions contained in the look-up table.

6. The method of claim 1, further including:

discarding the data signal according to the information contained in the look-up table.

7. A method of selectively transferring data signals between signal-producing elements and signal-receiving elements, comprising:

providing a first data transfer mechanism that has a plurality of input ports and a plurality of output ports, each input port being connected to one of the signal-producing elements and each output port being connected to one of the signal-receiving elements;

accepting a data signal from a first signal-producing element;

accessing a look-up table, which is stored in a memory, to determine what should be done with the data signal;

directing the data signal to at least one of the signal-receiving elements through at least one of the output ports according to information contained in the look-up table;

wherein the first data transfer mechanism and the look-up table are connected to a data bus, the data bus being connected to a processor, the method further including sending data signals from the processor to an output port according to instructions contained in the look-up table;

directing data signals from the processor to a first output port;

connecting the first output port to a first input port;

directing the data signals from the processor to one of the signal-receiving elements through another of the output ports according to information contained in the look-up table.

8. A method of selectively transferring data signals between signal-producing elements and signal-receiving elements, comprising:

providing a first data transfer mechanism that has a plurality of input ports and a plurality of output ports, each input port being connected to one of the signal-producing elements and each output port being connected to one of the signal-receiving elements;

accepting a data signal from a first signal-producing element;

accessing a look-up table, which is stored in a memory, to determine what should be done with the data signal;

directing the data signal to at least one of the signal-receiving elements through at least one of the output ports according to information contained in the look-up table;

connecting one of the output ports with one of the input ports;

defining a predetermined limit on the number of signal-receiving elements to which the data signal may be transferred in a transfer iteration;

after accepting the data signal through one of the input ports, accessing the lookup table to determine the number of transfers that are required for the date signal;

routing the transfers that do not exceed the predetermined limit to the signal-receiving elements as directed by the information contained in the look-up table;

directing the transfers that exceed the predetermined limit through the output port that is connected to the input port;

accessing the look-up table to determine where the transfers exceeding the predetermined limit are to be routed; and repeating the routing, directing and accessing steps until the data signal has been transferred to all desired signal-receiving elements.

9. An apparatus for transferring data signals, comprising:

a first input/output (I/O) device having a first plurality of input ports attached to signal-producing elements and a first plurality of output ports attached to signal-receiving elements, the first I/O device being connected to a data bus that transfers data signals between all components connected thereto, wherein the data bus is connected to a processor, and wherein each data signal entering the first data transfer mechanism through the data bus and the first plurality of input ports has a data identification information associated therewith;

a first memory connected to the data bus, the first memory storing at least one transfer directive that corresponds to each data identification information;

a second memory connected to the data bus, the second memory storing data signals as instructed by the transfer directive;

wherein the first I/O device directs data signals from at least one of the first plurality of input ports and at least one of the components connected to the data bus, to at least one of the first plurality of output ports and at least one of the components connected to the data bus, according to the at least one transfer directive stored in the first memory;

a second I/O device connected to the data bus, the second I/O device having a second plurality of input ports attached to signal-producing elements, the second I/O device further having a second plurality of output ports attached to signal-receiving elements, wherein each data signal entering the second data transfer mechanism through the data bus and the second plurality of input ports has a data identification information associated therewith;

wherein at least one transfer directive corresponding to each data identification information is stored in the first memory; and wherein the second I/O device directs data signals from at least one of the second plurality of input ports and at least one of the components connected to the data bus, to at least one of the second plurality of output ports and the components connected to the data bus, according to the at least one transfer directive stored in the first memory.

* * * * *